Sept. 8, 1931.  W. C. FISHER  1,822,135
ENDLESS ELASTIC BAND
Filed Nov. 16, 1927
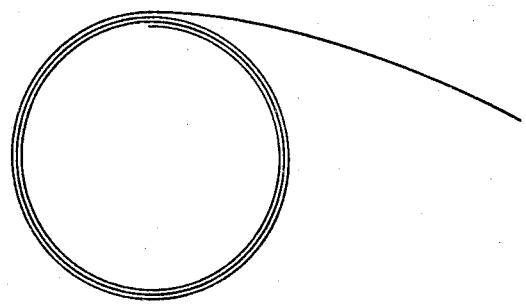
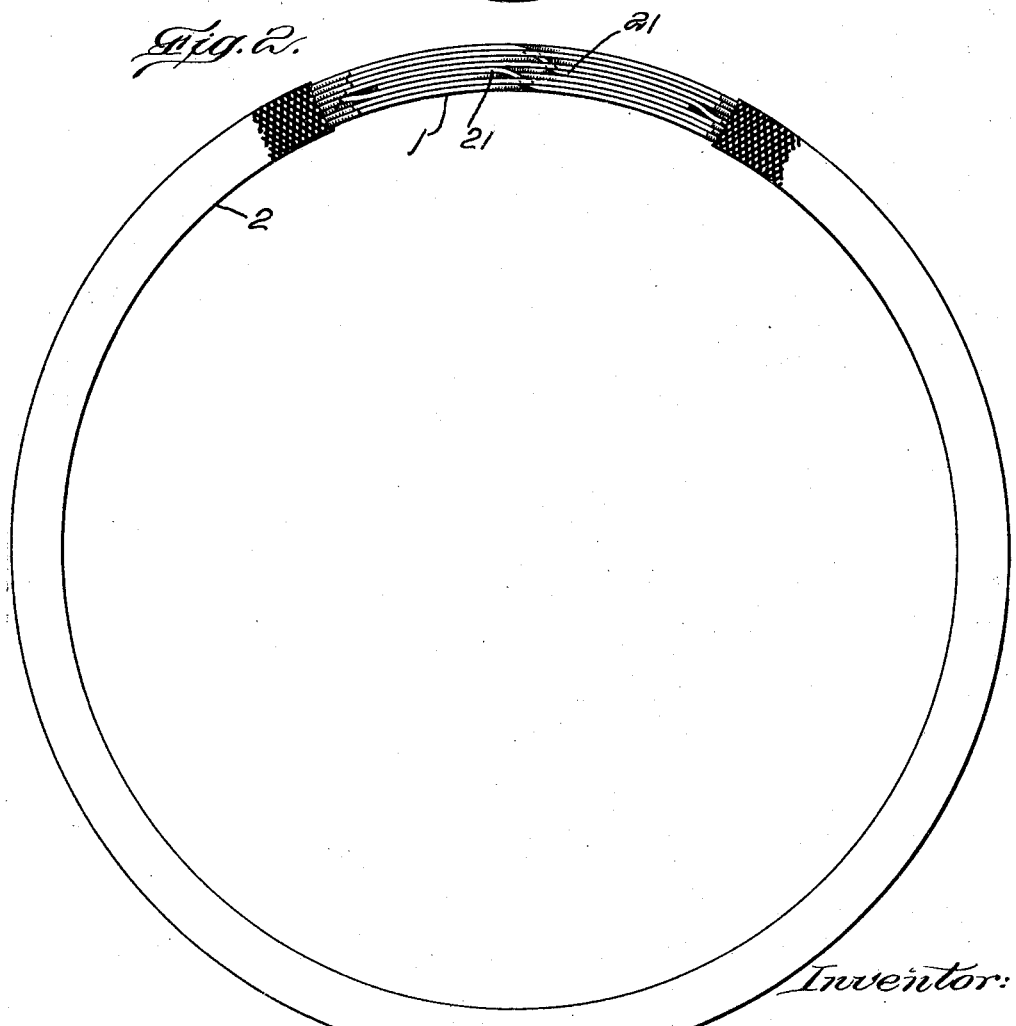

Patented Sept. 8, 1931

1,822,135

UNITED STATES PATENT OFFICE

WILLIAM C. FISHER, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT

ENDLESS ELASTIC BAND

Application filed November 16, 1927. Serial No. 233,648.

The invention has relation to endless elastic bands, and particularly to endless elastic bands of a character rendering them adapted to be used as springs, for example as shock absorbers, especially in connection with the landing gear of airplanes. Endless elastic bands have been employed more or less extensively in airplanes, made of rubber molded or cut in substantial rings or closed loops of strength sufficient to withstand the severe but momentary shocks incident to landing an airplane. Such endless elastic bands have advantages of lightness, &c., as compared with the more familiar metal springs.

An endless elastic band made as described hereinafter has advantages over the old solid rubber bands, through its greater resistance to wear and rough usage, and lessened tendency to break when the exterior of the rubber body becomes torn, cut or worn. In the case of elastic bands made with one or two strands of rubber of large cross-section, a cut or break in the surface of the rubber is speedily followed by parting of the strand, with consequent disabling of the spring or shock-absorber.

Prior attempts to employ a plurality of turns of relatively fine rubber cord to make elastic bands of this type have been of limited success owing to the difficulty of securing the ends of the continuous rubber cord, or of the several rubber cords employed, so that they would not creep within the body of the elastic band and through thus attaining different tensions in the band bring about breakage of those coils left under greater tension when the band was put under strain, as at the moment of landing of the airplane. It has been proposed to prevent this creeping of the end portions of the rubber cord by tying them together, but this has not been entirely successful owing to the pronounced tendency of rubber cord to break when tied in a knot.

To overcome this limitation, in the use of rubber cord of relatively fine diameter in an assembly of a plurality of coils to form an endless band, the invention provides an elastic band comprising the assembly of a plurality of coils of rubber cord of small diameter, with the free extremities of the component cord woven into the coils and with a substantial amount of the end portion of the cord beyond the point of such interweaving brought again into parallel with the coils and sheathed within the coils, so as to secure the ends against creeping and also to avoid the aforesaid breaking of the rubber cord resulting from the attempt to knot the ends together.

A further limitation of prior devices of this type has been the restriction of the extensibility of the elastic band through applying the enveloping and protecting fabric sheath while the component coils or strands are subjected to tension. It being practicable to apply this fabric sheath only in tight relation about the article being covered, the result of such application of the sheath while the composite band is under tension is that the coils of elastic bands so made are prevented by the sheath from assuming a completely relaxed relation as the sheath prevents the strands singly and collectively from expanding laterally in relaxing. Thus these prior elastic-bands have been made of coils having a rather high degree of initial tension, serving no useful purpose and reducing by so much the extensibility of the band as determined by the stretching power of the component coils from a position of complete relaxation to that of maximum stretch. When used as shock absorbers for airplanes, it is essential to provide the landing-gear with a movement of relatively great scope, often of two or more feet, in order that the shock of landing may be transmitted to the air-plane over relatively great amplitude of movement and period of time. With shock absorbers made of elastic bands having the aforesaid initial tension, their extensibility is materially lessened, often to the extent of necessitating the use of levers and other devices objectionable on the score of added weight and wind-resistance, in order to secure this essential scope of movement. To obviate this limitation the invention provides an elastic band formed with little or no initial tension, so as to permit the utmost extensibility attainable, and secured by applying the fabric sheath or covering while the component coils are in relaxed condition.

The invention provides a novel and improved elastic band for airplane springs and other uses, made of a plurality of coils of rubber cord wound in an annulus, with the free extremities of the cord tucked or plunged and thereby sheathed within the body formed by the accumulated coils so as to be covered by the coils about them and held thereby from withdrawal, and with an extensible fabric covering the whole.

An illustrative embodiment of the invention is shown in the accompanying drawings, in which Fig. 1 represents the coil-forming operation, diagrammatically, and Fig. 2 shows a band made according to the invention, with a portion broken away to reveal some of the coils of the rubber cord of which the core or body part thereof is made, and the mode of tucking-in the free extremities of cord.

Having reference to the drawings,—

The rubber for the core or body 1 is in the form of continuous cord, thread, or the like, and of any convenient diameter, as for example around 1/32 to 1/64 of an inch. It is not essential that the cord, thread, or the like be integrally made of one piece, as if properly cemented the material may be pieced without impairing the strength of the finished band. The use of rubber ribbon instead of thread, in continuous strips about ⅛ inch wide by 1/120 inch thick, is contemplated. In making the core or body I wind a cord or cords, or the like, into the form of a coil as in Fig. 1, the winding being effected in practice on a reel or other former, under suitable tension so that a multiplicity of coils is accumulated of substantially uniform tension. The elastic strength of the finished elastic band is in direct proportion to the number of turns or coils of the cord or the like which are put into the construction of the annulus or loop of rubber.

When the proper number of coils or turns of rubber, cord, thread, or the like, for the size and strength of endless band desired has accumulated upon the reel or other former, the windings are removed in relaxed condition and transferred to a machine which braids or weaves a continuous extensible seamless tubular fabric covering 2 about the bunched coils or turns of rubber thread while still in relaxed condition, binding them into a compact bundle having a circular cross-section. The covering is carried around the circuit of the open loop and over the starting point of the weaving to provide a generous overlap to prevent the rubber being exposed when the band is stretched to its limit, and in some instances is carried around the circuit a second time and slightly beyond the starting point, to provide a double covering.

By way of preparation for the application of the covering, each of the terminal or free, extremities of the continuous cord, thread, or the like, as 21, 21, Fig. 2, is pushed crosswise or obliquely through the accumulated coils or turns, and a substantial amount, such as 2 or 3 inches, of the end-portion of the cord beyond the point where it passes crosswise or obliquely through the coils, is brought again into parallel with the coils and buried in the interior thereof, as in Fig. 2, so as to locate it within the mass of coils or turns, sheathing it therein so as to be covered and concealed by the coils or turns about them, and so as to be held in parallel with the coils. As the coils tighten when the band is stretched, the section of the end-portion which extends obliquely through the accumulated mass of coils is bent sharply in one direction at one point and in another direction at another, so as to assume an undulant form, interwoven with the tightly-drawn strands or coils, resulting in its being held tightly and securely against creeping even under maximum strain. By this manner of securing the ends, the danger of breakage of the rubber cord incident to knotting the ends is avoided while the ends are held against slipping with the requisite degree of tightness.

What I claim as my invention is:—

1. An elastic band made of a plurality of coils of rubber cord wound in an annulus, with the free extremities of the cord woven into the coils obliquely to the direction of extent of the coils and with a substantial amount of the end-portion of the cord beyond the point of such interweaving brought again into parallel with the coils and sheathed within the coils, and an extensible fabric covering the whole.

2. An elastic band made of a plurality of coils of rubber cord wound in an annulus, with the free extremities of the cord woven into the coils obliquely to the direction of extent of the coils and with a substantial amount of the end-portion of the cord beyond the point of such interweaving brought again into parallel with the coils and sheathed within the coils, and an extensible fabric covering the whole applied while the coils are in relaxed condition.

3. An elastic band made of a plurality of coils of rubber cord wound in an annulus, bound together by a covering of extensible fabric, the coils being normally in relaxed condition, and the free extremities of the cord woven into the coils obliquely to the direction of extent of such coils.

WILLIAM C. FISHER.